US010422917B2

(12) United States Patent
Hou

(10) Patent No.: US 10,422,917 B2
(45) Date of Patent: Sep. 24, 2019

(54) SAND-RESISTIVITY/CONDUCTIVITY AND SATURATION EVALUATION IN LAMINATED FORMATIONS WITH BIAXIAL ANISOTROPY

(71) Applicant: Halliburton Energy Services, Inc., Houston, TX (US)

(72) Inventor: Junsheng Hou, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 53 days.

(21) Appl. No.: 15/512,414

(22) PCT Filed: Apr. 19, 2016

(86) PCT No.: PCT/US2016/028292
§ 371 (c)(1),
(2) Date: Mar. 17, 2017

(87) PCT Pub. No.: WO2017/184122
PCT Pub. Date: Oct. 26, 2017

(65) Prior Publication Data
US 2018/0172874 A1  Jun. 21, 2018

(51) Int. Cl.
*G01V 3/38* (2006.01)
*G01V 11/00* (2006.01)
(Continued)

(52) U.S. Cl.
CPC ............ *G01V 3/38* (2013.01); *G01V 3/28* (2013.01); *G01V 11/002* (2013.01); *G01V 3/32* (2013.01); *G01V 5/10* (2013.01)

(58) Field of Classification Search
USPC ........................................................... 702/7
See application file for complete search history.

(56) References Cited

U.S. PATENT DOCUMENTS 7,295,927 B2 * 11/2007 Clavaud .................. G01V 1/50
702/7
2002/0101235 A1 * 8/2002 Schoen .................... G01V 3/32
324/303
(Continued)

OTHER PUBLICATIONS

International Search Report and Written Opinion dated Jan. 18, 2017, International PCT Application No. PCT/US2016/028292.
(Continued)

*Primary Examiner* — Paul D Lee
(74) *Attorney, Agent, or Firm* — McGuireWoods LLP

(57) ABSTRACT

Disclosed herein are embodiments of systems, methods, and computer program products for evaluating sand-resistivity and/or sand-conductivity, as well as saturation in laminated shale-sand formations with biaxial anisotropy (BA) in resistivity. In one embodiment, the method determines sand resistivity ($R_{sd}$) of the laminated shale-sand formation directly from triaxial resistivities ($R_x$, $R_y$, and $R_z$) of the laminated shale-sand formation based on a bimodal model with BA anisotropy. In another embodiment, the method determines sand resistivity ($R_{sd}$) directly based on a bimodal model with transverse isotropy (TI) anisotropy using the triaxial resistivities, horizontal resistivity, and vertical resistivity ($R_x$, $R_y$, $R_z$, $R_h$, and $R_v$). In another disclosed embodiment, the above methods may be used to perform quality control on a determined sand-resistivity and saturation of a laminated shale-sand formation.

18 Claims, 7 Drawing Sheets

(51) Int. Cl.
  *G01V 3/28* (2006.01)
  *G01V 5/10* (2006.01)
  *G01V 3/32* (2006.01)

(56) References Cited

U.S. PATENT DOCUMENTS

| | | | |
|---|---|---|---|
| 2003/0105590 A1 | 6/2003 | Mollison et al. | |
| 2003/0222651 A1* | 12/2003 | Tabanou | G01V 3/20 324/367 |
| 2006/0085135 A1* | 4/2006 | Clavaud | E21B 49/00 702/12 |
| 2006/0161350 A1 | 7/2006 | Wang et al. | |
| 2007/0239360 A1* | 10/2007 | Rabinovich | G01V 3/28 702/11 |
| 2007/0267192 A1 | 11/2007 | Wang et al. | |
| 2009/0287416 A1 | 11/2009 | Minh | |
| 2010/0004866 A1 | 1/2010 | Rabinovich et al. | |
| 2013/0204534 A1* | 8/2013 | Anand | G01V 3/38 702/11 |
| 2016/0187521 A1* | 6/2016 | Homan | G01V 3/28 324/338 |

OTHER PUBLICATIONS

Mollison, R. A., et al. "A model for hydrocarbon saturation determination from an orthogonal tensor relationship in thinly laminated anisotropic reservoirs." SPWLA 40th Annual Logging Symposium. Society of Petrophysicists and Well-Log Analysts, 1999.

Georgi, Daniel Taylan, Jurgen Hans Schoen, and Michael Rabinovich. "Biaxial anisotropy: Its occurrence and measurement with multicomponent induction tools." SPE Annual Technical Conference and Exhibition. Society of Petroleum Engineers, 2008.

Hou, Junsheng, Donderici, Burkay, Torres, David, and Quirein, John. "Characterization of Formation Fractures with Multicomponent Induction Logging Based on Biaxial Anisotropy Models: Method and Case Studies." SPWLA 56th Annual Logging Symposium, Jul. 18-22, 2015.

Quirein, John, et al. "Evaluation of general resistivity density-based saturation in thin, laminated sand-shale sequences." AAPG Int. Conf. Exhib."Asia Pacific Resources: Fueling the Future", Sep. 16-19, 2012, Singapore. 2012.

* cited by examiner

SAND-RESISTIVITY/CONDUCTIVITY AND SATURATION EVALUATION IN LAMINATED FORMATIONS WITH BIAXIAL ANISOTROPY

BACKGROUND

The present disclosure relates to oil and gas exploration and production, and more particularly to systems and methods for evaluating sand-resistivity and/or sand-conductivity, as well as saturation in laminated shale-sand formations with biaxial anisotropy.

Shale is one of the more important common constituents of rocks in log analysis. Aside from their effects on porosity and permeability, their importance stems from their electrical properties, which have a great influence on the determination of fluid saturations. Shale can exist in the form of laminae between which are layers of sand. Laminae are small scale sequence of fine layers that occurs in sedimentary rocks.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIG. 7A depicts a fracture that is parallel to the x-axis and FIG. 7B depicts a fracture that is parallel to the y-axis.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, and electrical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity. In addition, as used herein, the singular forms "a", "an" and "the" are intended to include the plural forms as well, unless the context clearly indicates otherwise.

Unless otherwise specified, any use of any form of the terms "connect," "engage," "couple," "attach," or any other term describing an interaction between elements is not meant to limit the interaction to direct interaction between the elements and may also include indirect interaction between the elements described.

The following written description discloses novel systems, methods, and computer program products for evaluating sand-resistivity and saturation in laminated shale-sand formations with biaxial anisotropy (BA) in resistivity. As an example, in one embodiment, the method determines sand resistivity ($R_{sd}$) of the laminated shale-sand formation directly from triaxial resistivities ($R_x$, $R_y$, and $R_z$) of the laminated shale-sand formation based on a bimodal model with BA anisotropy. In another embodiment, the method determines sand resistivity ($R_{sd}$) directly based on a bimodal model with transverse isotropy (TI) anisotropy using the triaxial resistivities, horizontal resistivity, and vertical resistivity ($R_x$, $R_y$, $R_z$, $R_h$, and $R_v$). In another disclosed embodiment, the above methods may be used to perform quality control on a determined sand-resistivity and saturation of a laminated shale-sand formation.

Figure 1:
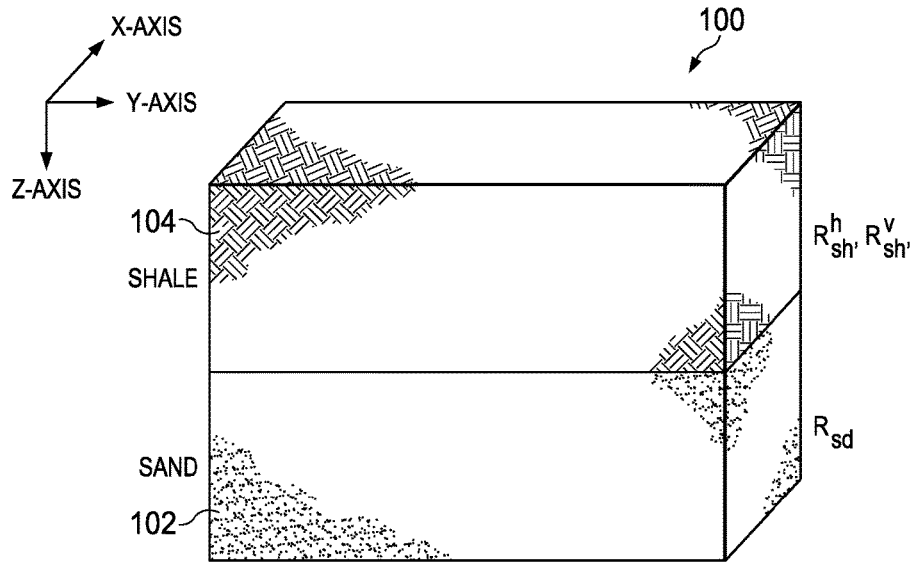
FIG. 1 is a schematic diagram depicting an example of a rock physics model comprising isotropic sand and transversely isotropic (TI) shale.

Referring now to the drawings, FIG. 1 is a schematic diagram depicting an example of a rock physics model 100 comprising isotropic sand 102 and transversely isotropic (TI) shale 104. Here $R_{sh}^h$ and $R_{sh}^v$ are the horizontal and vertical resistivities of the pure shale formation, and $R_{sd}$ is the sand resistivity.

Figure 2:
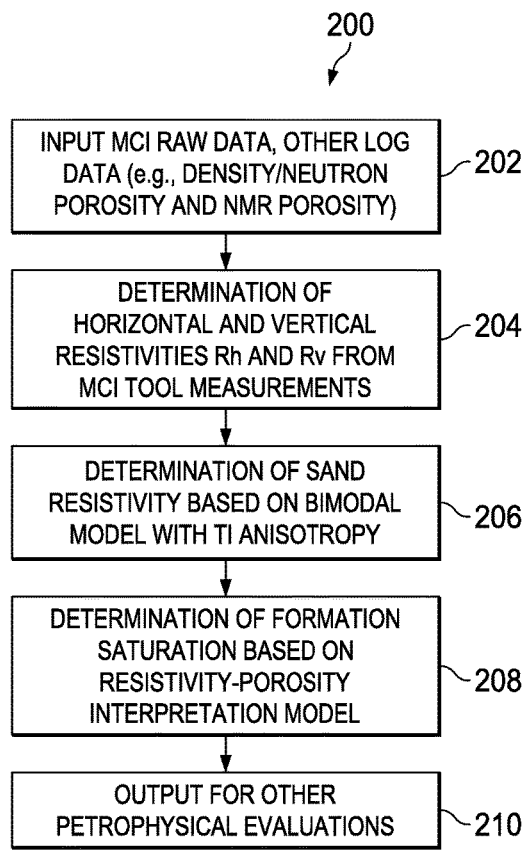
FIG. 2 is a flow diagram depicting an example of process for saturation evaluation with multi-component induction (MCI) combined with other sensor logs based on the rock physics model shown in FIG. 1.

Currently, in a laminated shale-sand formation, the rock physics model 100, also referred to as the bimodal rock-physics model with TI anisotropy in resistivity, is frequently used for the sand resistivity and saturation evaluation. For example, FIG. 2 is a flow diagram depicting an example of process 200 for saturation evaluation with multi-component induction (MCI) combined with other sensor logs based on the rock physics model shown in FIG. 1. The process 200 is implemented by a system having at least a processor for executing instructions, memory and/or other data storage component for storing data and executable instructions, and a network interface configurable to receive data from one or more devices. An example of such a system will be further described in FIG. 11. Although, FIG. 2 illustrates a particular sequence for performing saturation evaluation, it should be noted that the various methods disclosed herein may be performed in a sequence different from the depicted example including, but not limited to, omitting or adding one or more steps.

As shown in FIG. 2, the process 200 begins by receiving as input MCI raw data and other log data at step 202. The MCI data is received from an MCI tool such as, but not limited to, Halliburton's Xaminer$^{SM}$ Multicomponent Induction (MCI) service, which is configured to measure resistivity both vertically and horizontally of a formation at different depths of investigation. In some embodiments, when run with a directional instrument, the tool provides structural dip and azimuth. This data may be received in real-time during the drilling process or may be received after the drilling process. In certain embodiments, the MCI tool and other sensors may be configured to automatically send the MCI data and other log data to the disclosed system. Alternatively, the disclosed system may be configured to retrieve the data from the MCI tool and other sensors. Non-limiting examples of the MCI data include, but not limited to, density/neutron porosity and NMR porosity.

At step 204, the process performs a determination of horizontal resistivity $R_h$ and vertical resistivity $R_v$ from the MCI tool measurements. The process then performs a determination of sand resistivity $R_{sd}$ based on the bimodal model with TI anisotropy at step 206. At step 208, the process performs a determination of formation saturation based on a resistivity-porosity-saturation interpretation model, such as Archie's resistivity-porosity-saturation equation. The process then, at step 210, outputs the sand resistivity $R_{sd}$ and the formation saturation of the laminated shale-sand formation for other petrophysical evaluations.

However, in accordance with the disclosed embodiments, if a laminated shale-sand formation is biaxially anisotropic (i.e., having a physical property that has a different value when measured along two different axes in a formation bedding plane), a new rock physics model for BA anisotropy and a new process is required to provide a more accurate saturation evaluation of the laminated shale-sand formation. BA anisotropy in the laminated shale-sand formation is generally caused by the following factors: (i) fracture, (ii) cross-bedding, and (iii) intrinsic anisotropy such as resulting from grain size sorting in different directions.

Figure 3:
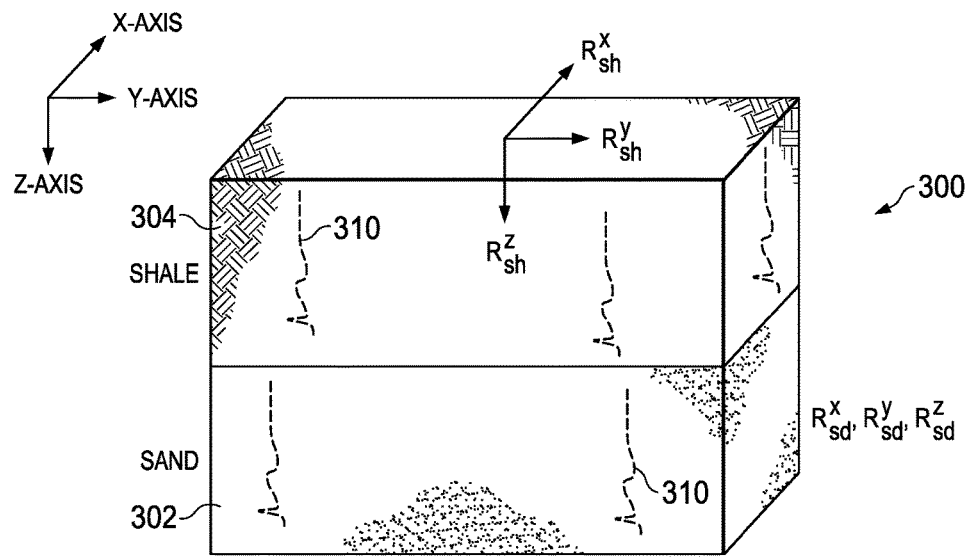
FIG. 3 is a schematic diagram depicting an example of a bimodal rock physics model comprising both biaxially anisotropic (BA) sand and shale.
Figure 4:
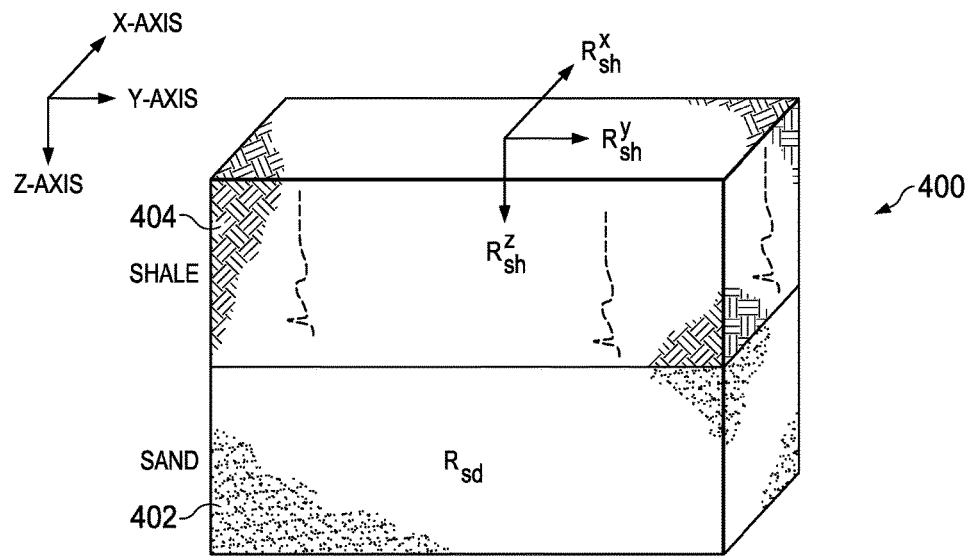
FIG. 4 is a schematic diagram depicting an example of a bimodal rock physics model which is composed of isotropic sand and biaxially anisotropic (BA) shale.

FIG. 3 is a schematic diagram depicting an example of a bimodal rock physics model 300 comprising both biaxially anisotropic (BA) sand 302 and shale 304. Here lines 310 represent fractures in the formations. Alternatively, if the sand 302 component is isotropic and there is the BA anisotropy only in the shale 304 in FIG. 3, then the bimodal rock physics model 300 is simplified as shown in FIG. 4. Here $R_{sd}$ is the isotropic sand resistivity.

Figure 5:
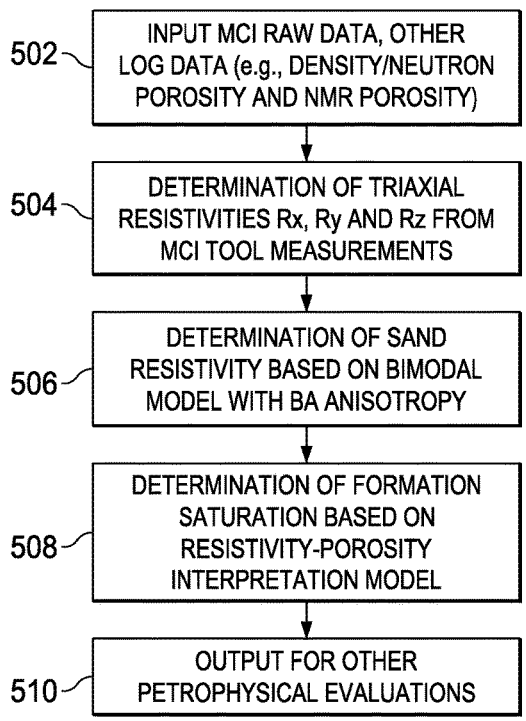
FIG. 5 is a flow diagram depicting an example of process for saturation evaluation with MCI and other sensor logs based on the models shown in FIG. 3 and FIG. 4.

FIG. 5 is a flow diagram depicting an example of process 500 for saturation evaluation with MCI and other sensor logs based on the models shown in FIG. 3 and FIG. 4. For instance, in one embodiment, the process 500 is configured to use the model illustrated in FIG. 3 if it is predetermined that the BA is caused by fractures. Otherwise, the process 500 is configured to use the model illustrated in FIG. 4 if it is predetermined that the BA is not caused by fractures.

Similar to FIG. 2, the process 500 begins at step 502 by receiving as input MCI raw data and other log data such as, but not limited to, density/neutron porosity and NMR porosity. At step 504, the process performs a determination of triaxial resistivities $R_x$, $R_y$, and $R_z$ of the laminated shale-sand formation from MCI tool measurements. Based on the new bimodal rock physics model 300 depicted in FIG. 3, in one embodiment, the triaxial resistivities, $R_x$, $R_y$, and $R_z$, of the shale-sand formation can be expressed as the following:

$$\frac{1}{R_x} = \frac{(1-V_{lam})}{R_{sd}^x} + \frac{V_{lam}}{R_{sh}^x}, \text{ or} \qquad (2.1\text{-}1)$$

$$\left(C_x = \frac{(1-V_{lam})}{R_{sd}^x} + \frac{V_{lam}}{R_{sh}^x} = (1-V_{lam}) \cdot C_{sd}^x + V_{lam} \cdot C_{sh}^x\right)$$

$$\frac{1}{R_y} = \frac{(1-V_{lam})}{R_{sd}^y} + \frac{V_{lam}}{R_{sh}^y}, \text{ or} \qquad (2.1\text{-}2)$$

$$\left(C_y = \frac{(1-V_{lam})}{R_{sd}^y} + \frac{V_{lam}}{R_{sh}^y} = (1-V_{lam}) \cdot C_{sd}^y + V_{lam} \cdot C_{sh}^y\right)$$

$$R_z = (1-V_{lam}) \cdot R_{sd}^z + V_{lam} \cdot R_{sh}^z, \qquad (2.1\text{-}3)$$

$$1 = V_{sd} + V_{lam}. \qquad (2.1\text{-}4)$$

Here, $R_x$, $R_y$, and $R_z$ are obtained by the inversion of the MCI tool measurements. $R_{sd}^x$, $R_{sd}^y$, and $R_{sd}^z$ are the triaxial resistivities of the pure sand resistivity (or $C_{sd}^x$, $C_{sd}^y$, and $C_{sd}^z$ are the sand triaxial conductivities). $V_{lam}$ is the volumetric fraction of laminated shale. $V_{sd}$ is the volumetric fraction of sand. $R_{sh}^x$, $R_{sh}^y$, and $R_{sh}^z$ are the triaxial resistivities of the pure shale formation. $R_{sh}^x$, $R_{sh}^y$, and $R_{sh}^z$ are generally selected from the inverted $R_x$, $R_y$, and $R_z$ in the neighboring pure shale formations, and are assumed constants over the interpretation interval. In addition, x, y, z is a formation principal coordinate system.

In transversely isotropic (TI) formations, the above four-equation system (2.1-1)-(2.1-4) will reduce to the conventional model as shown in FIG. 1 (or the three-equation system as shown below) if $R_x = R_y = R_h$; $R_{sh}^x = R_{sh}^y = R_{sh}^h$; and $R_z = R_v$.

$$\frac{1}{R_x} = \frac{(1-V_{lam})}{R_{sd}} + \frac{V_{lam}}{R_{sh}^x}, \qquad (2.1\text{-}1b)$$

$$\left(\text{or } C_x = \frac{(1-V_{lam})}{R_{sd}} + \frac{V_{lam}}{R_{sh}^x} = (1-V_{lam}) \cdot C_{sd} + V_{lam} \cdot C_{sh}^x\right)$$

$$\frac{1}{R_y} = \frac{(1-V_{lam})}{R_{sd}} + \frac{V_{lam}}{R_{sh}^y}, \qquad (2.1\text{-}2b)$$

$$\left(\text{or } C_y = \frac{(1-V_{lam})}{R_{sd}} + \frac{V_{lam}}{R_{sh}^y} = (1-V_{lam}) \cdot C_{sd} + V_{lam} \cdot C_{sh}^y\right),$$

$$R_z = (1-V_{lam}) \cdot R_{sd} + V_{lam} \cdot R_{sh}^z. \qquad (2.1\text{-}3b)$$

In this model, there are two unknown variables in the 3-equation system (2.1-1b)-(2.1-3b): $R_{sd}$ ($=R_{sd}^x=R_{sd}^y=R_{sd}^z$), and $V_{lam}$. From equations (2.1-1) and (2.1-2), if an assumption is made that $R_{sh}^x \neq R_{sh}^y$, then the equation for determining $V_{lam}$ is as follows:

$$V_{lam} = \frac{\frac{1}{R_x} - \frac{1}{R_y}}{\frac{1}{R_{sh}^x} - \frac{1}{R_{sh}^y}}, \text{ or } V_{lam} = \frac{C_x - C_y}{C_{sh}^x - C_{sh}^y}. \qquad (2.1\text{-}5)$$

$C_x$ and $C_y$ are the x- and y-directed conductivity. $C_{sh}^x$ and $C_{sh}^x$ are the x- and y-directed conductivity of the pure shale formation.

Once $V_{lam}$ is determined from equation (2.1-5), the process, at step 506, performs a determination of sand resistivity $R_{sd}$ of the laminated shale-sand formation based on a bimodal model with BA anisotropy using the determined triaxial resistivities $R_x$, $R_y$, and $R_z$. For instance, in one embodiment, the process may be configured with the following equation for the determination of the sand resistivity $R_{sd}$:

$$R_{sd} = \frac{R_z - V_{lam} \cdot R_{sh}^z}{(1 - V_{lam})}. \tag{2.1-6}$$

Where, $V_{sd} = 1 - V_{lam}$. (2.1-7)

Once the sand resistivity is determined, the process, at step 508, performs a determination of water saturation of the laminated shale-sand formation based on the resistivity-porosity interpretation model. Various resistivity-based saturation equations such as Archie's law for hydrocarbon-bearing clean sand, dual-water model, and Waxman-Smits model may be used in this determination. For example, in one embodiment, if the process uses Archie's law, then the $S_w$ is determined using the following equation $$S_w = \left[ \frac{a}{\phi^m} \cdot \frac{R_w}{R_{sd}} \right]^{\frac{1}{n}} \tag{2.1-8}$$

Here, $S_w$ is the water saturation (or the hydrocarbon saturation $S_{hc} = 1 - S_w$) with dimensionless; $R_w$ is the formation water resistivity (ohm-m); $\phi$ is the formation porosity with dimensionless; a is the tortuosity or Archie lithology factor (dimensionless); m is the Archie porosity or cementation exponent (dimensionless); and n is the Archie saturation exponent (dimensionless), which can vary from about 1.2 to 25 for different rock types, saturating fluid types, and wettability conditions. Moreover, the formation porosity $\phi$ is obtained from density/neutron porosity or nuclear magnetic resonance (NMR) porosity, the formation water resistivity is usually obtained from resistivity, SP, or water sample measurements, and m and n are estimated from local knowledge.

At step 510, the process outputs the sand resistivity $R_{sd}$ and the water saturation of the laminated shale-sand formation. In certain embodiments, the process may utilize the sand resistivity $R_{sd}$ and the water saturation $S_w$ of the laminated shale-sand formation for other petrophysical evaluations.

Figure 6:
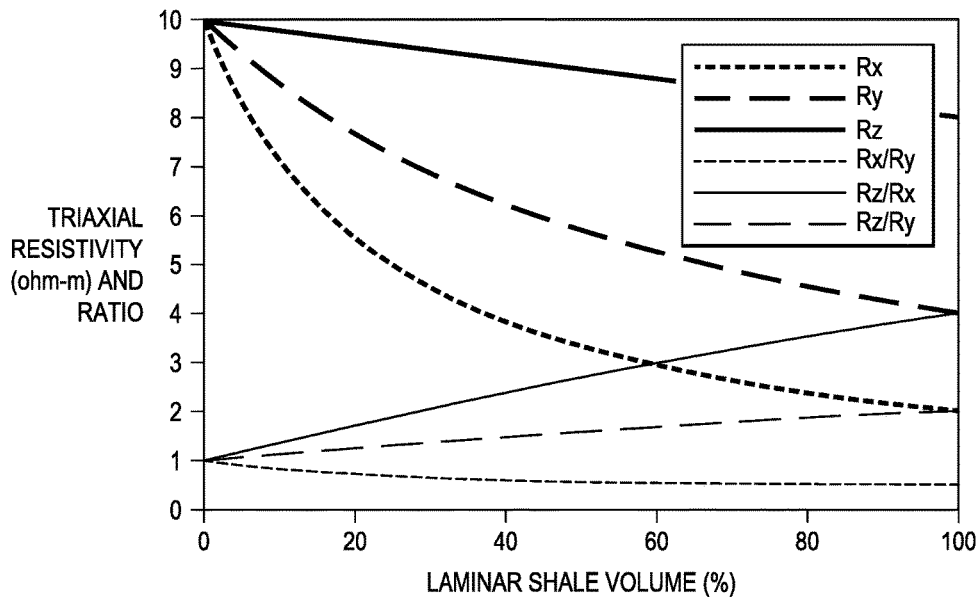
FIG. 6 is a graph depicting an example of simulated results of triaxial resistivities (Rx, Ry, Rz) and their ratios (Rx/Ry, Rz/Rx, Rz/Ry) vs. laminar shale volume.

FIG. 6 is a graph depicting an example of simulated results of triaxial resistivities (Rx, Ry, Rz) and their ratios (Rx/Ry, Rz/Rx, Rz/Ry) as a function of laminar shale volume by using equations (2.1-1b)-(2.1-3b). In the depicted example, $R_{sd} = 10$ ohm-m, $R_{sh}^x = 2$ ohm-m, $R_{sh}^y = 4$ ohm-m, and $R_{sh}^z = 8$ ohm-m.

Accordingly, the above description discloses a first embodiment for determining sand-resistivity and saturation of a laminated shale-sand formation with biaxial anisotropy (BA).

Figure 7A:
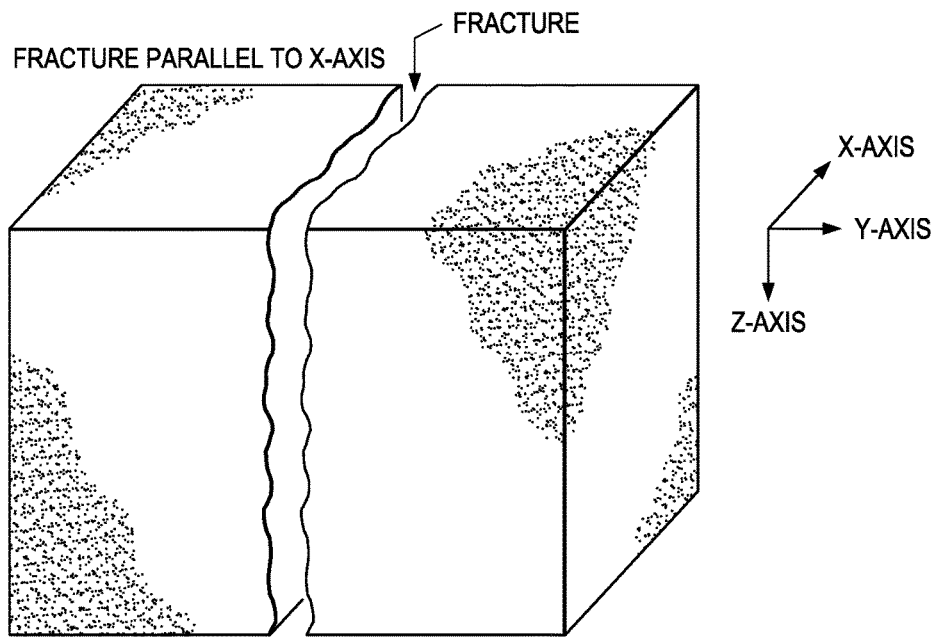
FIGS. 7A and 7B are schematic diagrams depicting an example of a rock physics model composed of BA anisotropic shale-sand formation and isotropic fracture.
Figure 7B:
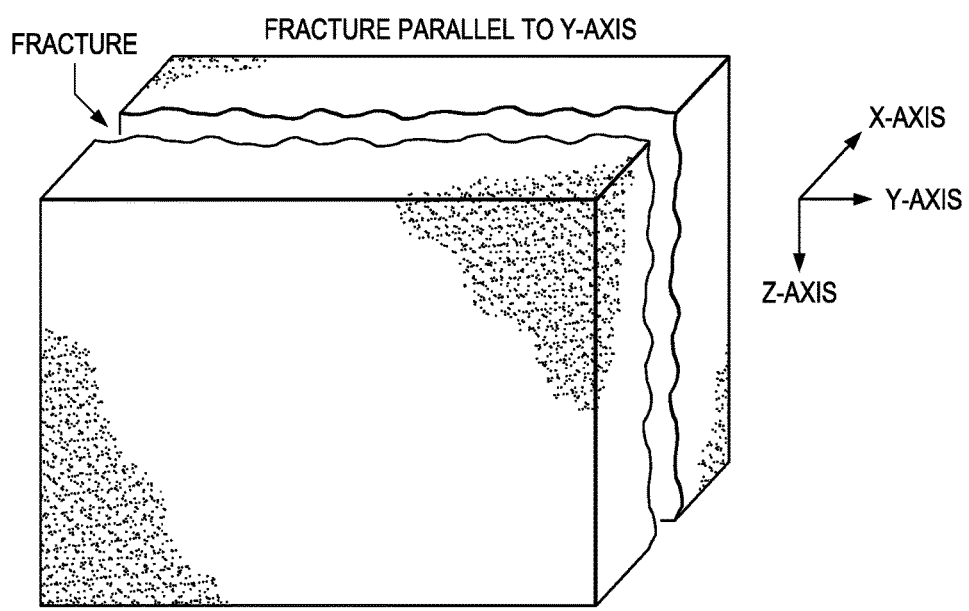

A second embodiment will now be described for evaluating sand-resistivity and water saturation of a laminated shale-sand formation with biaxial anisotropy (BA) and isotropic fracture. To illustrate this embodiment, FIGS. 7A and 7B are schematic diagrams depicting an example of a rock physics model composed of BA anisotropic shale-sand formation and isotropic fracture. In this embodiment, an assumption is made that the fractures are normal to the bedding plane. That being the case, there are three cases for the fracture strike: (a) fracture is parallel to the x-axis as depicted in FIG. 7A, (b) fracture is parallel to the y-axis as depicted in FIG. 7B, and (c) there are the fractures parallel to the x- and y-axis (not depicted).

Figure 10:
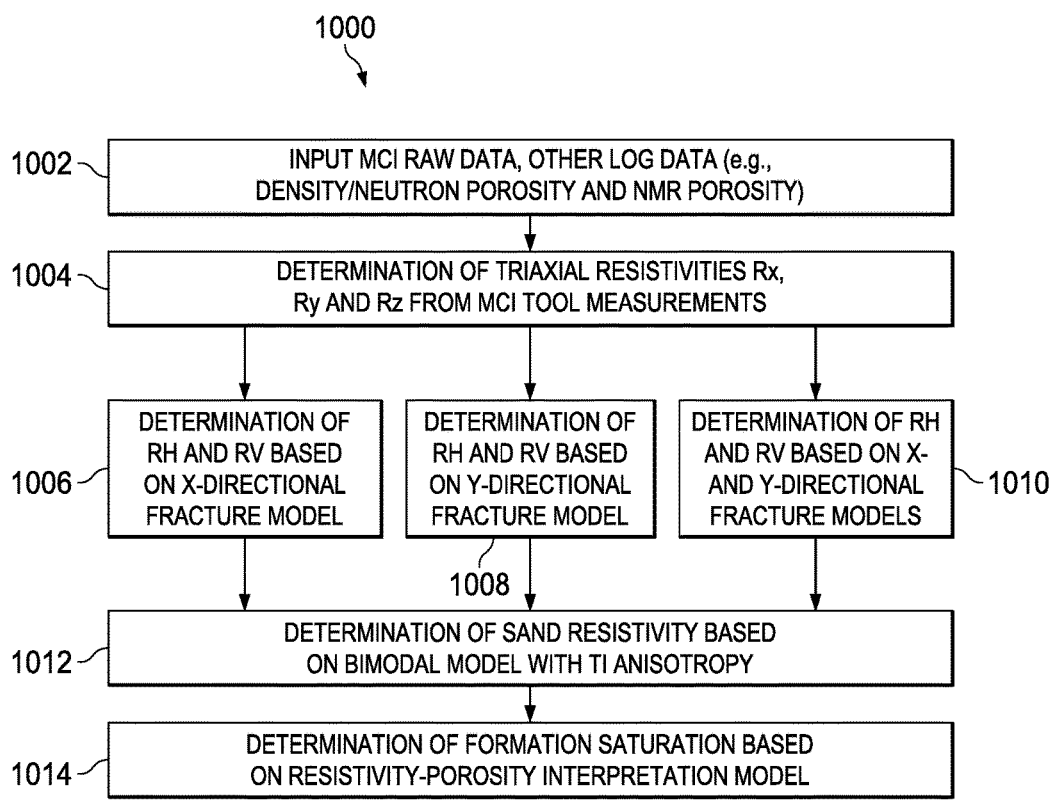
FIG. 10 is a flow diagram depicting an example of process for sand resistivity and saturation evaluation with MCI and other sensor logs based on the models as shown in FIG. 7 and FIG. 1.

FIG. 10 is a flow diagram depicting an example of process 1000 for determining sand resistivity $R_{sd}$ and water saturation $S_w$ evaluation with MCI and other sensor logs based on the models as shown in FIGS. 7A and 7B, and FIG. 1. In the depicted embodiment, the process 1000 begins at step 1002 by receiving as input MCI raw data and other log data such as, but not limited to, density/neutron porosity and NMR porosity. At step 1004, the process performs a determination of triaxial resistivities $R_x$, $R_y$, and $R_z$ of the laminated shale-sand formation from MCI tool measurements. Based on the new bimodal rock physics model depicted in FIGS. 7A and 7B, the process 1000 is configured to determine horizontal resistivity $R_h$ and vertical resistivity $R_v$ based on the direction of the fracture using the corresponding fracture model.

For example, in one embodiment, if it is determined that the fracture is determined to be parallel to the x-axis, the process at step 1006 is configured to determine $R_h$ and $R_v$ based on the x-directional fracture model shown in FIG. 7A using the following equations for determining $R_h$ and $R_v$:

$$\frac{1}{R_x} = \frac{(1 - \varphi_f)}{R_h} + \frac{\varphi_f}{R_{fw}}, \tag{2.2-1}$$

$$\left( \text{or } C_x = \frac{(1 - \varphi_f)}{R_h} + \frac{\varphi_f}{R_{fw}} = (1 - \varphi_f) \cdot C_h + \varphi_f \cdot C_{fw} \right)$$

$$R_y = (1 - \varphi_f) \cdot R_h + \varphi_f \cdot R_{fw}, \tag{2.2-2}$$

$$\frac{1}{R_z} = \frac{(1 - \varphi_f)}{R_v} + \frac{\varphi_f}{R_{fw}}, \text{ or} \tag{2.2-3}$$

$$C_z = \frac{(1 - \varphi_f)}{R_v} + \frac{\varphi_f}{R_{fw}} = (1 - \varphi_f) \cdot C_v + \varphi_f \cdot C_{fw}.$$

Here $\varphi_f$ is the fracture porosity, $$R_{fw} \left( \text{or } C_{fw} = \frac{1}{R_{fw}} \right)$$

is the resistivity (or conductivity) of fracture-filling fluid (for drilling induced fractures, $R_{fw}$ is the mud resistivity or the mixture of the mud and formation fluid; for natural fractures, $R_{fw}$ is the formation fluid (water or hydrocarbon) resistivity), $R_h$ (or $C_h$) is the horizontal resistivity (or conductivity) of an unfractured formation, $R_v$ (or $C_v$) is the vertical resistivity (or conductivity) of an unfractured formation. In one embodiment, if the fracture is filled with oil-based mud (OBM), then the process is configured with the following equations to estimate the fracture porosity and $R_h$, $R_v$ in equations (2.2-1)-(2.2-3):

$$R_x \approx R_h, R_z \approx R_v, \text{ and } \varphi_f = \frac{R_y - R_x}{R_{fw} - R_x}.$$

Alternatively, in one embodiment, the horizontal and vertical resistivities of the unfractured shale-sand formation are determined by the following equations based on the model as shown in FIG. 1

$$\frac{1}{R_h} = \frac{(1-V_{lam})}{R_{sd}} + \frac{V_{lam}}{R_{sh}^h}, \quad (2.2\text{-}4)$$

$$\left(\text{or } C_h = \frac{(1-V_{lam})}{R_{sd}} + \frac{V_{lam}}{R_{sh}^h} = (1-V_{lam}) \cdot C_{sd} + V_{lam} \cdot C_{sh}^h\right).$$

$$R_v = (1-V_{lam}) \cdot R_{sd} + V_{lam} \cdot R_{sh}^v. \quad (2.2\text{-}5)$$

As shown above, from equations (2.2-4) and (2.2-5), $R_h$ is a function of variables $V_{lam}$, $R_{sd}$, and $R_{sh}^h$; and $R_v$ is a function of variables $V_{lam}$, $R_{sd}$, and $R_{sh}^v$. Thus, in one embodiment, from equation (2.2-4) and equation (2.2-5) respectively, the process is configured with the following equations for determining the laminar shale volume $V_{lam}$:

$$V_{lam} = \frac{C_h - C_{sd}}{C_{sh}^h - C_{sd}} = \frac{R_{sh}^h \cdot (R_{sd} - R_h)}{R_h \cdot (R_{sd} - R_{sh}^h)}. \quad (2.2\text{-}6a)$$

$$V_{lam} = \frac{R_{sd} - R_v}{R_{sd} - R_{sh}^v} = \frac{C_{sh}^v \cdot (C_v - C_{sd})}{C_v \cdot (C_{sh}^v - C_{sd})} \text{ or} \quad (2.2\text{-}6b)$$

$$1 - V_{lam} = \frac{R_v - R_{sh}^v}{R_{sd} - R_{sh}^v}.$$

By solving equations (2.2-6a) and (2.2-6b) or a quadratic equation about $R_{sd}$, the process 1000 can obtain the sand resistivity $R_{sd}$ based on the bimodal model with TI anisotropy at step 1012.

However, if it is determined that the fracture is parallel to the y-axis, in one embodiment, the process is configured to determine horizontal resistivity $R_h$ and vertical resistivity $R_v$ based on the y-directional fracture model (as shown in FIG. 7B) using a similar five-equation system except that $R_x$ and $R_y$ are determined based on the following equations (replacing equations 2.2-1 and 2.2-2):

$$R_x = (1-\varphi_f) \cdot R_h + \varphi_f \cdot R_{fw}, \quad (2.2\text{-}7)$$

$$\frac{1}{R_y} = \frac{(1-\varphi_f)}{R_h} + \frac{\varphi_f}{R_{fw}}, \text{ or} \quad (2.2\text{-}8)$$

$$C_y = \frac{(1-\varphi_f)}{R_h} + \frac{\varphi_f}{R_{fw}} = (1-\varphi_f) \cdot C_h + \varphi_f \cdot C_{fw}$$

The other three equations are the same as those of equations (2.2-3)-(2.2-5). Sand resistivity $R_{sd}$ and water saturation $S_w$ are determined as described above.

If it is determined that the fractures parallel to the x- and y-axis, then, in one embodiment, the process is configured to determine horizontal resistivity $R_h$ and vertical resistivity $R_v$ based on both a x-directional fracture model and a y-directional fracture model. For example, in one embodiment, the process is configured to calculate two horizontal resistivity $R_h$ and vertical resistivity $R_v$, and fracture porosity (one using the x-directional fracture model and the second using the y-directional fracture model) and select their means as the formation horizontal and vertical resistivity and fracture porosity for performing the sand resistivity calculation.

Figure 8:
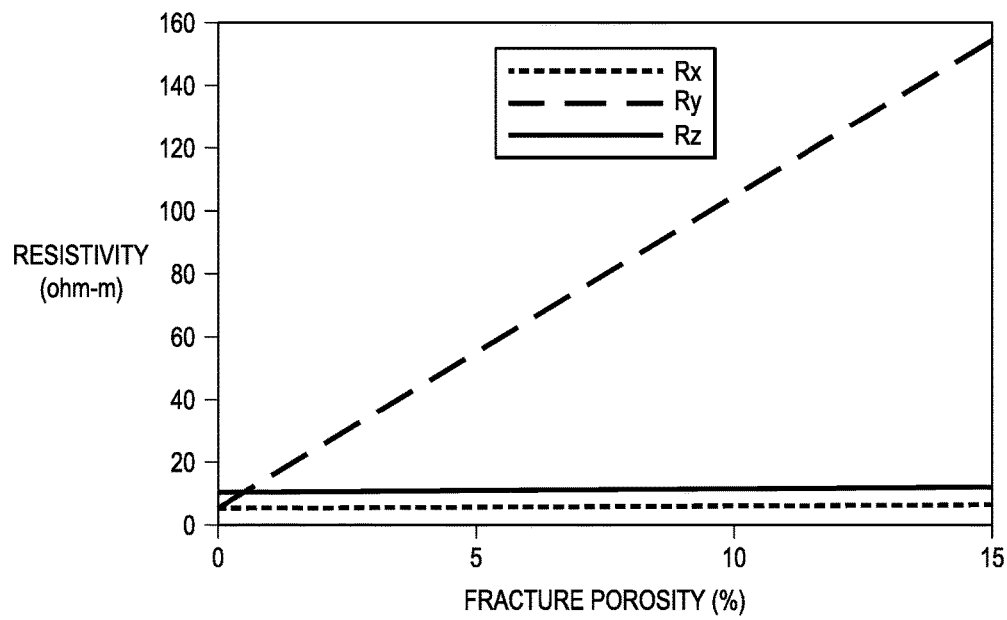
FIG. 8 is a graph depicting an example of simulated results of triaxial resistivities (Rx, Ry, Rz) as a function of fracture porosity using equations (2.2-1)-(2.2-3).
Figure 9:
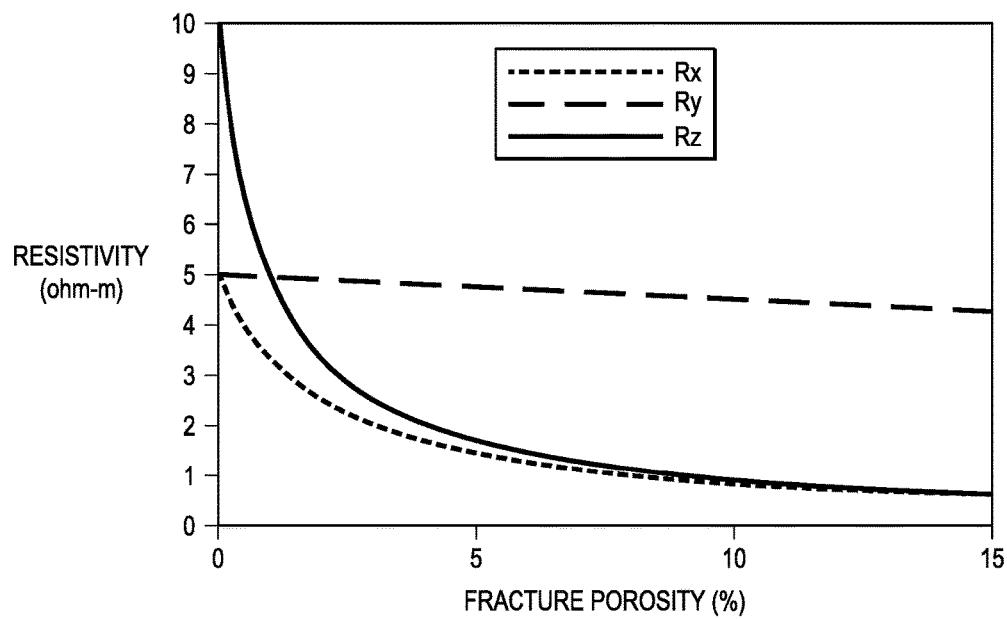
FIG. 9 is a graph depicting another example of simulated results of triaxial resistivities (Rx, Ry, Rz) as a function of fracture porosity using equations (2.2-1)-(2.2-3).

Simulated results of triaxial resistivities (Rx, Ry, Rz) as a function of fracture porosity using equations (2.2-1)-(2.2-3) are illustrated in FIGS. 8 and 9. FIG. 8 is a graph depicting an example of simulated results of triaxial resistivities (Rx, Ry, Rz) as a function of fracture porosity using equations (2.2-1)-(2.2-3) at a fracture fluid resistivity of 1000 ohm-m (high fluid resistivity), Rh=5 ohm-m, and Rv=10 ohm-m.

FIG. 9 is a graph depicting another example of simulated results of triaxial resistivities (Rx, Ry, Rz) as a function of fracture porosity using equations (2.2-1)-(2.2-3) at a fracture fluid resistivity of 0.1 ohm-m (low resistivity fluid), Rh=5 ohm-m, and Rv=10 ohm-m.

Accordingly, based on the above description, at least two techniques are described herein for evaluating sand-resistivity and saturation of a laminated shale-sand formation with biaxial anisotropy (BA). Using these two techniques, in one embodiment, a computer-implemented method may be configured for performing quality control on a determined sand-resistivity and saturation of a laminated shale-sand formation with biaxial anisotropy. For instance, in one embodiment, the method includes 1) determining a first sand resistivity $R_{sd}$ and a first water saturation $S_w$ of the laminated shale-sand formation using a first method, 2) determining a second sand resistivity $R_{sd}$ and a second water saturation $S_w$ of the laminated shale-sand formation using a second method, and 3) performing a comparison of the first sand resistivity $R_{sd}$ and the first water saturation $S_w$ of the laminated shale-sand formation to the second sand resistivity $R_{sd}$ and the second water saturation $S_w$ of the laminated shale-sand formation. As described above, in one embodiment, the first method comprises determining a first sand resistivity $R_{sd}$ of the laminated shale-sand formation based on a bimodal model with biaxial anisotropy (BA) anisotropy using a first determined $R_x$, $R_y$, and $R_z$; while the second method comprises determining a second sand resistivity $R_{sd}$ of the laminated shale-sand formation based on a bimodal model with transverse isotropy (TI) anisotropy using a second determined $R_x$, $R_y$, $R_z$, $R_h$, and $R_v$. In certain embodiments, the quality control method may further be configured to 1) determine whether a first difference in the first sand resistivity $R_{sd}$ and the second sand resistivity $R_{sd}$ is within a first predetermined error threshold; and 2) determine whether a second difference in the first water saturation $S_w$ and the second water saturation $S_w$ is within a second predetermined error threshold. The first predetermined error threshold and the second predetermined error threshold may be the same or may be different, and may be set based on a percentage difference or on a set range.

Figure 11:
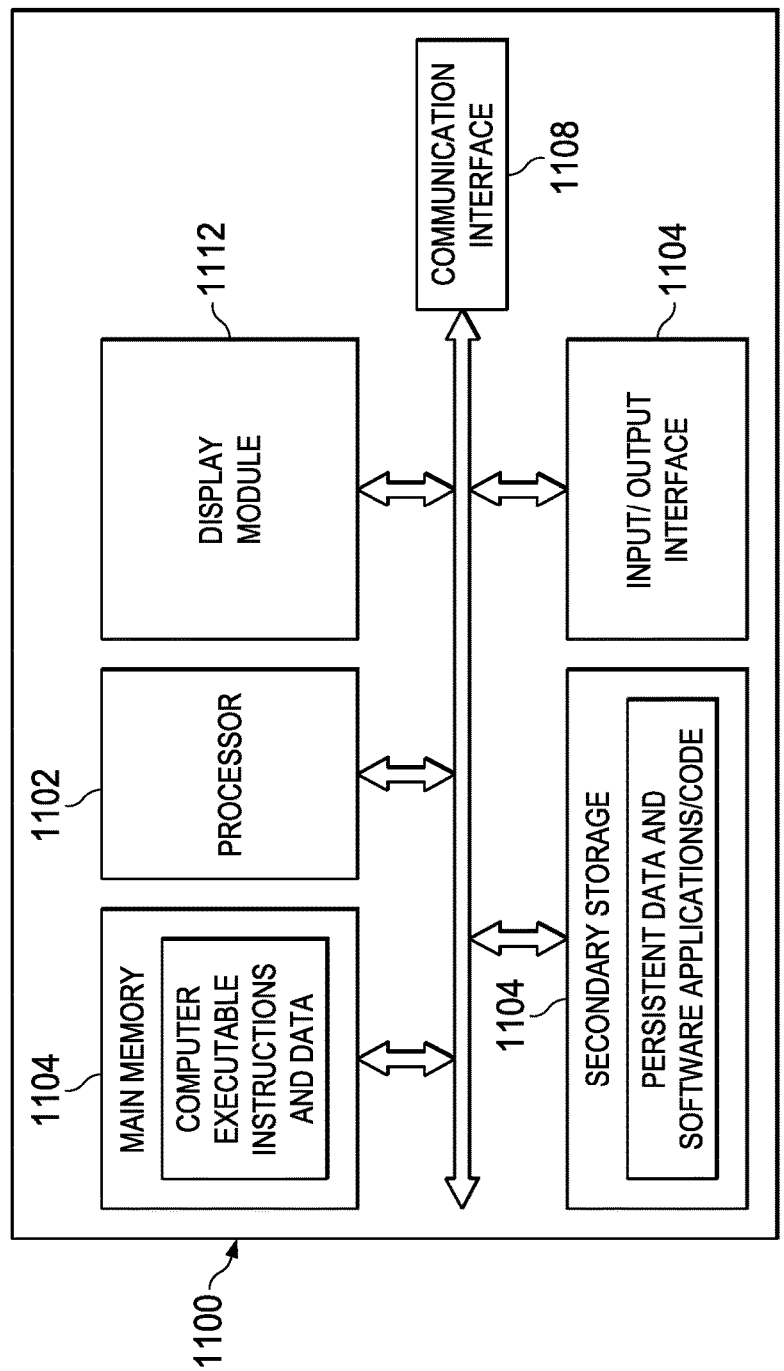
FIG. 11 is a schematic diagram illustrating an example of a system that may be used for evaluating sand-resistivity and/or sand-conductivity, as well as saturation of a laminated shale-sand formation with biaxial anisotropy (BA) according to an exemplary embodiment.

FIG. 11 is a schematic diagram illustrating a system 1100 that may be used for evaluating sand-resistivity and/or sand-conductivity, as well as saturation of a laminated shale-sand formation with biaxial anisotropy (BA) according to an exemplary embodiment. In certain embodiments, the system 1100 may be located at a well site and configured to receive the MCI data and other log data directly from the tools/sensors during the drilling process. In addition to or alternatively, the system 1100 may be configured to receive the MCI data and other log sensor data after the drilling process. The system 1100 may also be located off-site of the drilling site. For example, in one embodiment, the MCI data and other log sensor data may be sent to the system 1100 over a secure private or even public network.

The system 1100 includes a processor 1102, main memory 1104, secondary storage unit 1106, an input/output interface module 1110, and a communication interface module 1108. The processor 1102 may be any number of or type of processors capable of executing instructions for performing the features and functions of the disclosed embodiments.

The input/output interface module 1110 enables the system 1100 to receive user input (e.g., keyboard, mouse, touchscreen) and output information to one or more devices such as, but not limited to, printers, an external data storage drive, and audio and video components.

The communication interface module 1108 enables the system 1100 to communicate data with other devices over a public or private, wired or wireless network. Non-limiting examples of communication types that may be employed include, but not limited to, near field communication, Wi-Fi communication, cellular data communication, or Ethernet communication. For example, in one embodiment, the system 1100 may communicate with the receivers over a secured wireless communication channel to receive seismic data. In some embodiments, communication between the system 1100 and other devices may utilize, but not limited to, a local area network, a wide area network, or the Internet.

The system 1100 may optionally include a graphics or display module 1112 to enable information to be displayed on an internal or external display device. For instance, the display module 1112 may include instructions or hardware for providing touchscreen capabilities for receiving user input via the display device. In certain embodiments, the display module 1112 may also include instructions for enabling multi-touch functionalities associated with a display device. In some embodiments, the display module 1112 may include its own graphics processor for the processing and rendering of images or videos.

Main memory 1104 is volatile memory that stores currently executing or prefetched instructions/data for execution by the processor 1102. Secondary storage unit 1106 is non-volatile memory. Examples of secondary storage unit 1106 may include any type of data storage component such as a hard drive, a flash drive, or memory card. The secondary storage unit 1106 is configured to store persistent data such as, but not limited to, computer executable instructions associated with software applications or an operating system. These instructions are passed from the secondary storage unit 1106 to main memory 1104 for enabling execution by the processor 1102. As an example, in one embodiment, the system 1100 is configured to execute a program, script, or algorithm to evaluate sand-resistivity and saturation in laminated formations with biaxial anisotropy in accordance with the example flowchart shown in FIGS. 5 and 10.

In addition to the disclosed methods and systems, the disclosed embodiments may also be embodied in a computer program product, comprising a non-transitory computer usable medium having a computer readable program code embodied therein.

It should be apparent from the foregoing that embodiments of an invention having significant advantages have been provided. For example, the disclosed embodiments provide a more accurate approach to determining sand resistivity and then (oil/water) saturation in laminated formations with biaxial anisotropy. While the embodiments are shown in only a few forms, the embodiments are not limited but are susceptible to various changes and modifications without departing from the spirit thereof.

Further, the steps of the methods described herein may be carried out in any suitable order, or simultaneously where appropriate. Thus, the scope of the claims should not necessarily be limited by the above description, which is merely provided as examples to enable one of ordinary skill in the art to practice the appended claims.

Moreover, while the appended claims recite specific combinations of features of the disclosed embodiments, other combinations of the claims may include one or more of the disclosed features combine in any number of combinations. In other words, it is intended that the disclosed embodiments support amendments to the appended claims or new claims that combine or omit various steps or features of the disclosed embodiments in any combination other than those specifically recited in the current appended claims. Additionally, the variables expressed in any formula recited in the claims shall have the meaning as defined in the specification.

I claim:

1. A computer-implemented method for evaluating at least one of sand-resistivity and sand-conductivity, as well as saturation of a laminated shale-sand formation with biaxial anisotropy (BA), the computer-implemented method comprising:

drilling within the laminated shale-sand formation;

disposing a multi-component induction (MCI) tool within the laminated shale-sand formation, wherein the MCI tool comprises a sensor, wherein the sensor measures a property of the laminated shale-sand formation selected from the group consisting of density, neutron porosity, NMR porosity, and any combination thereof to provide a raw data, transmitting the raw data to a system at a well site, wherein the system comprises a processor and a display module;

determining, by the processor, at least one of sand resistivity $R_x$, $R_y$, and $R_z$ and sand triaxial conductivities $C_{sd}^x$, $C_{sd}^y$, and $C_{sd}^z$ of the laminated shale-sand formation based on the raw data;

determining, by the processor, at least one of sand resistivity $R_{sd}$ and sand-conductivity $C_{sd}$ of the laminated shale-sand formation based on a bimodal model with BA anisotropy using the determined at least one of sand triaxial resistivities $R_x$, $R_y$, and $R_z$ and sand triaxial conductivities $C_{sd}^x$, $C_{sd}^y$, and $C_{sd}^z$;

determining, by the processor, a water saturation $S_w$ of the laminated shale-sand formation based on the resistivity-porosity-saturation interpretation models; and outputting, by the display module, the at least one sand resistivity $R_{sd}$ and sand-conductivity $C_{sd}$, and the water saturation $S_w$ of the laminated shale-sand formation; and adjusting drilling within the laminated shale-sand formation based on the outputting.

2. The computer-implemented method according to claim 1, wherein the water saturation $S_w$ is determined using one of a plurality of resistivity-porosity-saturation interpretation formulas.

3. The computer-implemented method according to claim 1, wherein the laminated shale-sand formation is composed of isotropic sand and biaxially anisotropic shale.

4. The computer-implemented method according to claim 1, wherein the laminated shale-sand formation is composed of both biaxially anisotropic (BA) sand and shale.

5. The computer-implemented method according to claim 1, wherein at least one of sand triaxial resistivities $R_x$, $R_y$, and $R_z$ and sand triaxial conductivities $C_{sd}^x$, $C_{sd}^y$, and $C_{sd}^z$ are determined using the following formulas:

$$\frac{1}{R_x} = \frac{(1-V_{lam})}{R_{sd}^x} + \frac{V_{lam}}{R_{sh}^x},$$

$$\left( \text{or } C_x = \frac{(1-V_{lam})}{R_{sd}^x} + \frac{V_{lam}}{R_{sh}^x} = (1-V_{lam}) \cdot C_{sd}^x + V_{lam} \cdot C_{sh}^x, \right.$$

$$\left. \text{here, } \frac{1}{R_x} = C_x \right)$$

$$\frac{1}{R_y} = \frac{(1-V_{lam})}{R_{sd}^y} + \frac{V_{lam}}{R_{sh}^y},$$

-continued $$\left(\text{or } C_y = \frac{(1-V_{lam})}{R_{sd}^y} + \frac{V_{lam}}{R_{sh}^y} = (1-V_{lam}) \cdot C_{sd}^y + V_{lam} \cdot C_{sh}^y,\right.$$

$$\left.\text{here, } \frac{1}{R_y} = C_y\right)$$

$$R_z = (1-V_{lam}) \cdot R_{sd}^z + V_{lam} \cdot R_{sh}^z,$$

$$\left(\text{or } \frac{1}{C_z} = (1-V_{lam}) \cdot \frac{1}{C_{sd}^z} + V_{lam} \cdot \frac{1}{C_{sh}^z}, \text{here, } \frac{1}{R_z} = C_z\right)$$

$1 = V_{sd} + V_{lam}$; wherein $V_{lam}$ is the volumetric fraction of laminated shale, $V_{sd}$ is the volumetric fraction of sand, $R_{sh}$ is the resistivity of the pure shale formation, and $C_{sh}$ is the conductivity of the pure shale formation.

6. The computer-implemented method according to claim 5, wherein $V_{lam}$ is the volumetric fraction of the laminated shale-sand formation and is determined utilizing the following equation:

$$V_{lam} = \frac{\frac{1}{R_x} - \frac{1}{R_y}}{\frac{1}{R_{sh}^x} - \frac{1}{R_{sh}^y}}.$$

7. The computer-implemented method according to claim 5, wherein $V_{lam}$ is the volumetric fraction of the laminated shale-sand formation and is determined utilizing the following equation:

$$V_{lam} = \frac{C_x - C_y}{C_{sh}^x - C_{sh}^y}.$$

8. The computer-implemented method according to claim 5, wherein the sand resistivity $R_{sd}$ is determined utilizing the following equation:

$$R_{sd} = \frac{R_z - V_{lam} \cdot R_{sh}^z}{(1 - V_{lam})}.$$

9. The computer-implemented method according to claim 1, further comprising utilizing the at least one sand resistivity $R_{sd}$ and sand-conductivity $C_{sd}$, and the water saturation $S_w$ of the laminated shale-sand formation for other petrophysical evaluations.

10. A computer-implemented method for evaluating sand-resistivity and saturation of a laminated shale-sand formation with biaxial anisotropy (BA) and isotropic fracture, the computer-implemented method comprising:
    drilling within the laminated shale-sand formation;
    disposing a multi-component induction (MCI) tool within the laminated shale-sand formation, wherein the MCI tool comprises a sensor, wherein the sensor measures a property of the laminated shale-sand formation selected from the group consisting of density, neutron porosity, NMR porosity, and any combination thereof to provide a raw data;
    transmitting the raw data to a system at a well site, wherein the system comprises a processor and a display module;
    determining, by the processor, triaxial resistivities $R_x$, $R_y$, and $R_z$ of the laminated shale-sand formation based on the raw data;
    determining, by the processor, horizontal resistivity $R_h$ and vertical resistivity $R_v$;
    determining, by the processor, sand resistivity $R_{sd}$ of the laminated shale-sand formation based on a bimodal model with transverse isotropy (TI) anisotropy using the determined $R_x$, $R_y$, $R_z$, $R_h$, and $R_v$;
    determining, by the processor, a water saturation $S_w$ of the laminated shale-sand formation based on resistivity-porosity-saturation interpretation models; and
    outputting, by the display module, the sand resistivity $R_{sd}$ and the water saturation $S_w$ of the laminated shale-sand formation, and
    adjusting drilling within the laminated shale-sand formation based on the outputting.

11. The computer-implemented method according to claim 10, wherein the step of determining horizontal resistivity $R_h$ and vertical resistivity $R_v$ is based on a x-directional fracture model if the isotropic fracture is parallel to a x-axis.

12. The computer-implemented method according to claim 10, wherein the step of determining horizontal resistivity $R_h$ and vertical resistivity $R_v$ is based on a y-directional fracture model if the isotropic fracture is parallel to a y-axis.

13. The computer-implemented method according to claim 10, wherein the step of determining horizontal resistivity $R_h$ and vertical resistivity $R_v$ is based on both a x-directional fracture model and a y-directional fracture model if the isotropic fracture is parallel to a x-axis or a y-axis.

14. The computer-implemented method according to claim 13, wherein the step of determining horizontal resistivity $R_h$ and vertical resistivity $R_v$ comprises:
    determining a first horizontal resistivity $R_h$ and a first vertical resistivity $R_v$ based on the x-directional fracture model;
    determining a second horizontal resistivity $R_h$ and a second vertical resistivity $R_v$ based on the y-directional fracture model;
    determining the horizontal resistivity $R_h$ to be a mean of the first horizontal resistivity $R_h$ and the second horizontal resistivity $R_h$; and
    determining the vertical resistivity $R_v$ to be a mean of the first vertical resistivity $R_v$ and the second vertical resistivity $R_v$.

15. The computer-implemented method according to claim 10, wherein the step of determining horizontal resistivity $R_h$ and vertical resistivity $R_v$ comprises determining a fracture porosity.

16. The computer-implemented method according to claim 10, wherein the step of determining horizontal resistivity $R_h$ and vertical resistivity $R_v$ comprises determining a volume of the laminated shale-sand formation $V_{lam}$.

17. A computer-implemented method for performing quality control on a determined sand-resistivity and saturation of a laminated shale-sand formation with biaxial anisotropy (BA), the computer-implemented method comprising:
    drilling within the laminated shale-sand formation;
    disposing a multi-component induction (MCI) tool within the laminated shale-sand formation, wherein the MCI tool comprises a sensor, wherein the sensor measures a property of the laminated shale-sand formation selected from the group consisting of density, neutron porosity, NMR porosity, and any combination thereof to provide a raw data;

transmitting the raw data to a system at a well site, wherein the system comprises a processor and a display module;

determining, by the processor, a first sand resistivity $R_{sd}$ and a first water saturation $S_w$ of the laminated shale-sand formation using a first method;

determining, by the processor, a second sand resistivity $R_{sd}$ and a second water saturation $S_w$ of the laminated shale-sand formation using a second method; and performing a comparison of the first sand resistivity $R_{sd}$ and the first water saturation $S_w$ of the laminated shale-sand formation to the second sand resistivity $R_{sd}$ and the second water saturation $S_w$ of the laminated shale-sand formation, wherein the step of performing the comparison of the first sand resistivity $R_{sd}$ and the first water saturation $S_w$ of the laminated shale-sand formation to the second sand resistivity $R_{sd}$ and the second water saturation $S_w$ of the laminated shale-sand formation comprises:

determining whether a first difference in the first sand resistivity $R_{sd}$ and the second sand resistivity $R_{sd}$ is within a first predetermined error threshold; and determining whether a second difference in the first water saturation $S_w$ and the second water saturation $S_w$ is within a second predetermined error threshold;

outputting, by the display module, the results of the comparison of the first sand resistivity $R_{sd}$ and the first water saturation $S_w$ of the laminated shale-sand formation to the second sand resistivity $R_{sd}$ and the second water saturation $S_w$ of the laminated shale-sand formation; and adjusting drilling within the laminated shale-sand formation based on the outputting.

18. A computer-implemented method for performing quality control on a determined sand-resistivity and saturation of a laminated shale-sand formation with biaxial anisotropy (BA), the computer-implemented method comprising:

drilling within the laminated shale-sand formation;
  disposing a multi-component induction (MCI) tool within the laminated shale-sand formation, wherein the MCI tool comprises a sensor, wherein the sensor measures a property of the laminated shale-sand formation selected from the group consisting of density, neutron porosity, NMR porosity, and any combination thereof to provide a raw data;

transmitting the raw data to a system at a well site, wherein the system comprises a processor and a display module;

determining, by the processor, a first sand resistivity $R_{sd}$ and a first water saturation $S_w$ of the laminated shale-sand formation using a first method, wherein the first method comprises determining a first sand resistivity $R_{sd}$ of the laminated shale-sand formation based on a bimodal model with biaxial anisotropy (BA) anisotropy using a first determined $R_x$, $R_y$, and $R_z$;

determining, by the processor, a second sand resistivity $R_{sd}$ and a second water saturation $S_w$ of the laminated shale-sand formation using a second method, wherein the second method comprises determining a second sand resistivity $R_{sd}$ of the laminated shale-sand formation based on a bimodal model with transverse isotropy (TI) anisotropy using a second determined $R_x$, $R_y$, $R_z$, $R_h$, and $R_v$; wherein $R_x$, $R_y$, $R_z$ are the triaxial resistivities $R_h$ is the horizontal resistivity and $R_v$ is the vertical resistivity; and performing a comparison of the first sand resistivity $R_{sd}$ and the first water saturation $S_w$ of the laminated shale-sand formation to the second sand resistivity $R_{sd}$ and the second water saturation $S_w$ of the laminated shale-sand formation;

outputting, by the display module, the results of the comparison of the first sand resistivity $R_{sd}$ and the first water saturation $S_w$ of the laminated shale-sand formation to the second sand resistivity $R_{sd}$ and the second water saturation $S_w$ of the laminated shale-sand formation;

adjusting drilling within the laminated shale-sand formation based on the outputting.

* * * * *